Figure 1:
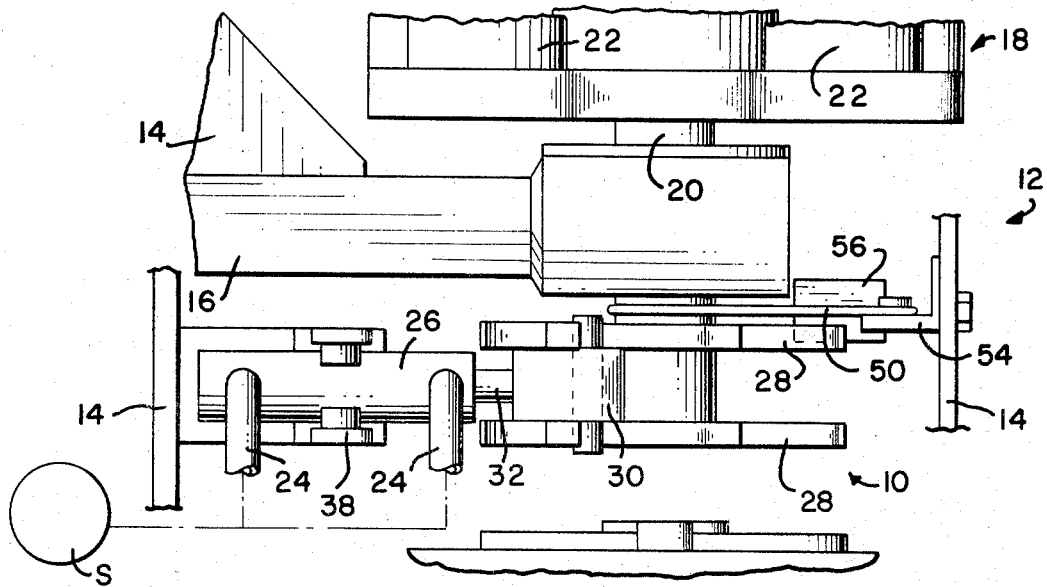

United States Patent
Coyne

[15] 3,684,039
[45] Aug. 15, 1972

[54] DRILL ROD INDEXING DEVICE

[72] Inventor: Francis P. Coyne, Clarksburg, W. Va.

[73] Assignee: Ingersoll-Rand Company, New York, N.Y.

[22] Filed: Sept. 21, 1970

[21] Appl. No.: 73,785

[52] U.S. Cl..................................175/85, 175/52
[51] Int. Cl. .................................E21b 19/00
[58] Field of Search.................................175/85, 52

[56] References Cited

UNITED STATES PATENTS

| | | |
|---|---|---|
| 3,025,918 | 3/1962 | Leven.....................175/85 X |
| 2,909,288 | 10/1959 | Boudette.................175/85 X |
| 3,336,991 | 8/1967 | Klem et al. ...................175/85 |

Primary Examiner—Marvin A. Champion
Assistant Examiner—Richard E. Favreau
Attorney—Frank S. Troidl, David W. Tibbott and Bernard J. Murphy

[57] ABSTRACT

A toothed ratchet wheel assembly fixed to the rotary shaft of a lazy-susan-type rod changer and storage unit which is selectively rotated by a fluid-powered cylinder and reciprocating piston rod. The end of the rod has a pawl fixed thereto which engages successive ratchet wheel teeth, with actuation of the cylinder, to position successively stored drill rods.

15 Claims, 2 Drawing Figures

PATENTED AUG 15 1972 3,684,039

INVENTOR
FRANCIS P. COYNE
BY
Bernard J. Murphy
AGENT

DRILL ROD INDEXING DEVICE

This invention pertains to indexing devices for drill rod changer and storage units, and in particular to such a device automatically and remotely operative for selectively positioning successively stored rods.

In the prior art drill rod changer and storage units which are movably indexed, relative to the drilling machine frame, by hand. Accordingly, the drilling machine operator must leave the cab, to slide or rotate the storage rack of the rod changer and storage device to position a successive rod.

It is an object of this invention to teach an automatic and remotely controlled drill rod indexing device, for use with a drill rod changer and storage unit, which obviates any need for the operator to leave the cab of the drilling machine to effect its operation, or for any other person manually to index the storage unit.

It is another object of this invention to teach an improved drill rod indexing device comprising a member for rigid attachment thereof to a drill rod changer and storage unit, the member having at least one surface with a plurality of relieved areas formed therein, a motor for attachment to the machine having an extended, movable rod with means fixed to one end thereof for engaging the relieved areas thereby to effect movement of the member and a rod changer and storage unit coupled thereto.

A feature of this invention, in one embodiment thereof, comprises a toothed ratchet wheel assembly fixed to the rotary shaft of a lazy-susan-type rod changer and storage unit which is selectively rotated by a fluid-powered cylinder and reciprocating piston rod. The end of the rod has a pawl fixed thereto which engages successive ratchet wheel teeth, with actuation of the cylinder, to position successively stored drill rods.

Figure 2:
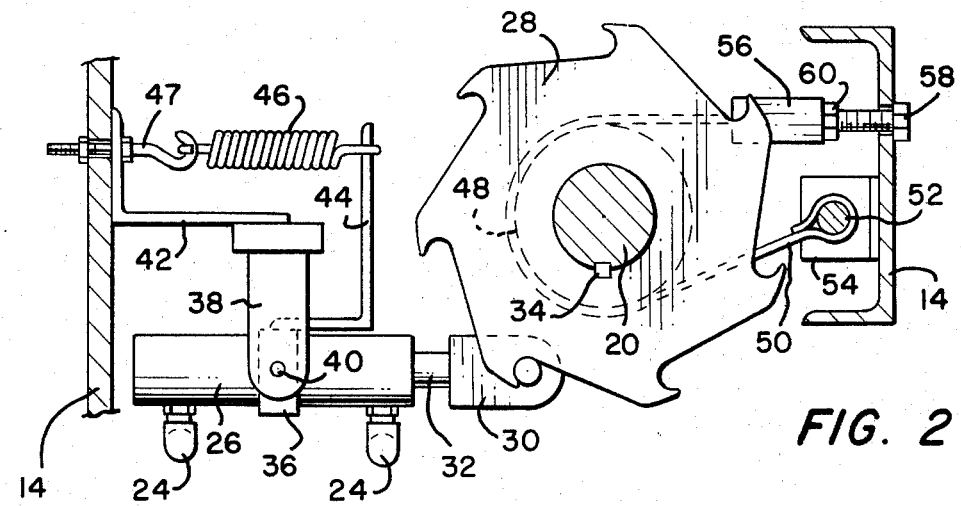

Further objects and features of this invention will become more apparent by reference to the following description taken in conjunction with the accompanying figures in which:

FIG. 1 is a side-elevation view of a portion of a drilling machine having a lazy-susan-type of rod changer and storage unit with an embodiment of the novel indexing device operatively associated with the unit; and FIG. 2 is an enlarged plan view of the novel device of FIG. 1.

As shown in FIG. 1, the novel drill rod indexing device 10 is shown in operative position in a drilling machine 12. The machine comprises a frame 14 from which extends a strut 16 which supports a rod changer and storage unit 18 which is movable relative to the frame. The unit, being of the lazy-susan-type, comprises a rotary shaft 20 about which are arrayed a plurality of drill rod storage sleeves 22.

The inventive device 10 is powered by hydraulic-fluid lines 24 which communicate a supply S (shown here symbolically) with a hydraulic-responsive cylinder 26. The device 10 comprises two ratchet wheels 28 the teeth of which are engaged by a pawl 30 fixed to the end of an extended, reciprocatable piston rod 32.

Further details of the device 10 are shown with more particularity in FIG. 2 where it can be seen that the ratchet wheels 28 (only one of which is visible here) are fixed to the rotary shaft 20 by means of a key 34. Cylinder 26 carries a sleeve 36 thereabout which is supported in a trunnion yoke 38 by means of pivot pins 40 (only one of which is shown). An angle iron 42 carries the trunnion yoke 38, and fixes it to the drilling machine frame 14. A double-ended support 44 is fixed to sleeve 36, at one end thereof, and mounts a spring 46 at the other end. Spring 46 is made taut to frame 14, by hardware 47, to constrain the pawl 30 in constant engagement with the ratchet wheels 28.

Between the ratchet wheels 28 there is disposed an annular, brake-drum surface 48. A brake band 50 has an intermediate portion thereof in engagement with surface 48 to dampen and insure a smooth, positive rotation of the ratchet wheels 28. One end of band 50 is fixed, by means of a pivot pin 52, to a bracket 54 carried by the frame 14. The other end of band 50 terminates in a nut sleeve 56 which receives a bolt 58 projecting from frame 14. An adjusting nut portion 60 of sleeve 56 facilitates the adjustment of the constraint with which brake band 50 engages surface 48.

In operation, pressurized fluid is admitted to cylinder 26 to cause rod 32 to translate relative to cylinder 26. When rod 32 is extended, the pawl 30 being constrained by a spring 46 against the wheels 28 reaches out for the nearest ratchet tooth, and snaps into an engageable position behind same. With retraction of rod 32, pawl 30 firmly engages the tooth it has reached and moves the tooth toward cylinder 26; the ratchet wheels are rotated and, by virtue of the keying thereof to shaft 20, cause a rotation of the rod changer and storage unit to which the wheels are fixed. Each time rod 32 is extended and retracted, then, the rod changer and storage unit is rotated one position, selectively to position successively stored drill rods for coupling thereof to a drill head (not shown), for instance, or to a preceding drill rod suspended below the drilling machine in the bore hole.

This novel device 10 obviates any requirement for a manual manipulation of the rod changer and storage unit, and makes it unnecessary for the operator to leave the cab to index drill rods.

The invention has been disclosed in connection with a lazy-susan type of drill rod storage and changer unit. However, to those skilled in the art to which this pertains, it will be quite evident that the teaching herein can readily be applied to drill rod storage and changer units in which drill rods are stored in-line, one behind the other. Also, while the disclosed embodiment shows, in FIG. 2, a clockwise rotation of the ratchet wheels 28, my teaching is applicable to a drill rod and storage unit rotatable—to position successively stored drill rods—in a counterclockwise direction. In such a latter embodiment, the pawl would initially engage oppositely disposed teeth of ratchet wheels, and move the teeth away from the cylinder with extension of the piston rod, and disengage from the teeth with retraction of the rod.

Accordingly, while I have described my invention in connection with a specific embodiment it is to be clearly understood that this is done only by way of example and not as a limitation to the scope of my invention as set forth in the objects thereof and the accompanying claims.

I claim:

1. For use in a drilling machine having a drill rod changer and storage unit movable relative to said machine for selective positioning of successively stored drill rods, an automatic drill rod indexing device, comprising:

a member for rigid attachment thereof to said unit;

said member having at least a first surface with a plurality of relieved areas formed therein;

a motor, for attachment thereof to said machine, having an extended, longitudinally movable rod;

said motor being actuable to move said rod; and said rod being longitudinally movable in first and second directions toward and away from said member, and having means automatically engageable with successive ones of said areas, upon movement of said rod in one of said directions and automatically disengageable therefrom, upon rod movement in the other of said directions, to effect movement of said member with actuation of said motor; wherein said relieved areas define a plurality of teeth serially arranged along said surface, said teeth extending from said member; and said engageable means comprises a pawl extending from said rod perpendicularly from the axis of longitudinal movement of said rod.

2. For use in a drilling machine having a drill rod changer and storage unit movable relative to said machine for selective positioning of successively stored drill rods, an automatic drill rod indexing device, comprising:

a member for rigid attachment thereof to said unit;

said member having at least a first surface with a plurality of relieved areas formed therein:

a motor, for attachment thereof to said machine, having an extended, longitudinally movable rod;

said motor being actuable to move said rod; and said rod being longitudinally movable in first and second directions toward and away from said member, and having means automatically engageable with successive ones of said areas, upon movement of said rod in one of said directions and automatically disengageable therefrom, upon rod movement in the other of said directions, to effect movement of said member with actuation of said motor; further including bracket means for facilitating an attachment of said motor to said machine; wherein said bracket means has means for constraining said engageable means in constant contact with said member throughout movement of said rod in both of said first and second directions; and wherein said bracket means further has a trunnion yoke;

said motor has a mounting sleeve disposed within said yoke; and said bracket means further including pivot pins interconnecting said yoke and said sleeve effecting a pivotal mounting of said motor in said yoke.

3. A device, according to claim 2, wherein:

said constraining means comprises resilient means interconnected between said motor and said frame.

4. For use in a drilling machine having a drill rod changer and storage unit movable relative to said machine for selective positioning of successively stored drill rods, an automatic drill rod indexing device, comprising:

a member for rigid attachment thereof to said unit;

said member having at least a first surface with a plurality of relieved areas formed therein;

a motor, for attachment thereof to said machine, having an extended, longitudinally movable rod;

said motor being actuable to move said rod; and said rod being longitudinally movable in first and second directions toward and away from said member, and having means automatically engageable with successive ones of said areas, upon movement of said rod in one of said directions and automatically disengageable therefrom, upon rod movement in the other of said directions, to effect movement of said member with actuation of said motor; and further including adjustable brake means, operatively interposed between said member and said machine, for controlling member movement.

5. In combination with a drilling machine having a frame, and a drill rod changer and storage unit movable relative to said frame for selective positioning of successively stored drill rods, an automatic drill rod indexing device, comprising:

a member rigidly fixed to said unit;

said member having at least a first surface with a plurality of relieved areas formed therein; and a fluid-actuable motor, attached to said frame, having a rod longitudinally movable extendibly from said motor in first and second directions toward and away from said relieved areas, in response to motor actuation;

said rod having means automatically engageable with successive ones of said areas, upon movement of said rod in one of said directions, and automatically disengageable therefrom upon rod movement in the other of said directions, to effect movement of said member and said unit with actuation of said motor; and wherein said member comprises a ratchet wheel assembly having a rotation axis;

said assembly having a plurality of ratchet wheels fixed in juxtaposition along said rotation axis;

ratchet teeth of at least two wheels of said plurality thereof being in line parallel with said axis; and said engageable means comprises a pawl extending perpendicularly from the longitudinal movement axis of said rod.

6. A device according to claim 5, further including:

bracket means attaching said motor to said frame;

said bracket means having means constraining said engageable means in constant contact with said member throughout movement of said rod in both of said first and second directions.

7. A device, according to claim 6, further including:

adjustable brake means, operatively interposed between said member and said frame, for controlling member movement.

8. A device, according to claim 6, wherein:

said ratchet wheel assembly has at least one annular, brake-drum surface intermediate one pair of wheels of said plurality thereof; and further including a double-ended brake band having an intermediate portion disposed in constraint on at least a portion of said brake-drum surface, and the ends thereof coupled to said frame.

9. A device according to claim 8, wherein:

one end of said band is pivotally coupled to said frame, and the other end thereof has means for adjusting said band constraint.

10. A device, according to claim 5, further including:

supply of motor-actuable fluid; and means for conducting fluid from said supply to said motor for enabling actuation thereof.

11. A device, according to claim 10, wherein:

said motor comprises a hydraulically actuable piston-cylinder;

said rod comprises a piston rod; and said supply comprises pressured hydraulic fluid.

12. In combination with a drilling machine having a frame, and a drill rod changer and storage unit movable relative to said frame for selective positioning of successively stored drill rods, an automatic drill rod indexing device, comprising:

a member rigidly fixed to said unit;

said member having at least a first surface with a plurality of relieved areas formed therein; and a fluid-actuable motor, attached to said frame, having a rod longitudinally movable extendibly from said motor in first and second directions toward and away from said relieved areas, in response to motor actuation;

said rod having means automatically engageable with successive ones of said areas, upon movement of said rod in one of said directions, and automatically disengageable therefrom upon rod movement in the other of said directions, to effect movement of said member and said unit with actuation of said motor; and further including bracket means attaching said motor to said frame;

said bracket means having means constraining said engageable means in constant contact with said member throughout movement of said rod in both of said first and second directions; and wherein said bracket means further has a trunnion yoke;

said motor has a mounting sleeve disposed within said yoke; and said bracket means further includes pivot pins interconnecting said yoke and said sleeve effecting a pivotal mounting of said motor in said yoke.

13. A device, according to claim 12, wherein:

said bracket means further has a double-ended support; and said yoke is fixed to said support at one end thereof, and said support is fixed to said frame at the other end thereof.

14. A device, according to claim 13, wherein:

said constraining means comprises resilient means interconnected between said motor and said other end of said support.

15. For use in a drilling machine having a drill rod changer and storage unit movable relative to said machine for selective positioning of successively stored drill rods, an automatic drill rod indexing device, comprising:

a member for rigid attachment thereof to said unit;

said member having at least a first surface with a plurality of relieved areas formed therein;

a motor, for attachment thereof to said machine, having an extended, longitudinally movable rod;

said motor being actuable to move said rod; and said rod being longitudinally movable in first and second directions toward and away from said member, and having means automatically engageable with successive ones of said areas, upon movement of said rod in one of said directions and automatically disengageable therefrom, upon rod movement in the other of said directions, to effect movement of said member with actuation of said motor;

further including bracket means for facilitating an attachment of said motor to said machine; wherein said bracket means has means for constraining said engageable means in contact with said member; and wherein said constraining means comprises resilient means interconnected between said motor and said frame.

* * * * *